(12) United States Patent
Yang et al.

(10) Patent No.: US 12,093,313 B2
(45) Date of Patent: Sep. 17, 2024

(54) INFORMATION DISPLAYING METHOD AND DEVICE

(71) Applicant: BEIJING ZITIAO NETWORK TECHNOLOGY CO., LTD., Beijing (CN)

(72) Inventors: Yuxin Yang, Beijing (CN); Ruixin Feng, Beijing (CN); Weiyi Chang, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 3 days.

(21) Appl. No.: 17/600,342

(22) PCT Filed: Jul. 15, 2021

(86) PCT No.: PCT/CN2021/106592
§ 371 (c)(1),
(2) Date: Sep. 30, 2021

(87) PCT Pub. No.: WO2022/028227
PCT Pub. Date: Feb. 10, 2022

(65) Prior Publication Data
US 2022/0318301 A1    Oct. 6, 2022

(30) Foreign Application Priority Data
Aug. 3, 2020 (CN) .......................... 202010767377.5

(51) Int. Cl.
*G06F 16/64* (2019.01)
*G06F 3/16* (2006.01)

(52) U.S. Cl.
CPC ................ *G06F 16/64* (2019.01); *G06F 3/16* (2013.01)

(58) Field of Classification Search
CPC ..................................................... G06F 16/64
(Continued)

(56) References Cited

U.S. PATENT DOCUMENTS 10,012,691 B1 * 7/2018 Zhou .................. G01R 31/2856
2010/0305726 A1  12/2010 Lu et al.
(Continued)

FOREIGN PATENT DOCUMENTS

| CN | 101984490 A | 3/2011 |
| CN | 106658201 A | 5/2017 |

(Continued)

OTHER PUBLICATIONS

International Patent Application No. PCT/CN2021/106592, International Search Report mailed Oct. 12, 2021, 4 pages.
(Continued)

*Primary Examiner* — Ruay Ho

(57) ABSTRACT

Embodiments of the disclosure provide an information displaying method and device. The method includes: acquiring audio data to be played; displaying an audio spectrum corresponding to the audio data, where the audio spectrum displays a playback progress of the audio data. The embodiments of the present disclosure display a playback progress of audio through an audio spectrum, which can blend the audio spectrum with a playback progress, possessing rich display effects, and can also save a space occupied by a progress bar when displayed separately; meanwhile, a user can perceive the playback progress of the audio when enjoying the audio spectrum, improving an audio playback experience of the user.

18 Claims, 6 Drawing Sheets

(58) Field of Classification Search
USPC .................. 715/716; 725/37; 398/118
See application file for complete search history.

(56) References Cited

U.S. PATENT DOCUMENTS

| | | | | |
|---|---|---|---|---|
| 2014/0082666 | A1* | 3/2014 | Bloch | G06F 3/04842 |
| | | | | 725/37 |
| 2014/0286644 | A1* | 9/2014 | Oshima | H04B 10/11 |
| | | | | 398/118 |
| 2015/0153943 | A1 | 6/2015 | Wang | |
| 2017/0332120 | A1* | 11/2017 | Maynard | H04N 21/4882 |
| 2019/0348062 | A1* | 11/2019 | Gao | G10L 25/24 |
| 2021/0304784 | A1* | 9/2021 | Paine | G10L 25/51 |

FOREIGN PATENT DOCUMENTS

| | | |
|---|---|---|
| CN | 107220047 A | 9/2017 |
| CN | 107220048 A | 9/2017 |
| CN | 107221021 A | 9/2017 |
| CN | 107393571 A | 11/2017 |
| CN | 107886969 A | 4/2018 |
| CN | 304737394 S | 7/2018 |
| CN | 109120983 A | 1/2019 |
| CN | 305280745 S | 7/2019 |
| CN | 110750230 A | 2/2020 |
| CN | 110868642 A | 3/2020 |
| CN | 111026907 A | 4/2020 |
| KR | 20080040274 A | 5/2008 |

OTHER PUBLICATIONS

First Office Action issued Mar. 30, 2023 in Chinese Application No. 202010767377.5, with partial English translation (11 pages).
Pei-gang He et al., "Speech spectrum smoothing algorithm based on Fourier transform," Computer Engineering and Applications, 2008, 44(3), with English Abstract (4 pages).
Second Office Action issued Jun. 1, 2023 in Chinese Application No. 202010767377.5, with partial English translation (12 pages).
Third Office Action issued Aug. 18, 2023 in Chinese Application No. 202010767377.5, with partial English translation (9 pages).
Gu Cheng, "Android custom View, Android cool music spectrum progress bar, music progress bar with easy changes," Jul. 12, 2019, with English translation (13 pages).

* cited by examiner

INFORMATION DISPLAYING METHOD AND DEVICE

CROSS-REFERENCE TO RELATED APPLICATIONS

This application is a National Stage of International Application No. PCT/CN2021/106592, filed on Jul. 15, 2021, which claims priority to Chinese Patent Application No. 202010767377.5, filed on Aug. 3, 2020. The disclosures of the aforementioned applications are incorporated herein by reference in their entireties.

TECHNICAL FIELD

Embodiments of the present disclosure relates to the field of audio processing technologies, and in particular, to an information displaying method and device.

BACKGROUND

With the progress of the times, people pay more and more attention to enjoyment of visual and sound quality. Audio signal spectrum is widely involved in many fields due to its numerous advantages.

At present, in a traditional audio playback App (application), a playback progress of audio is usually displayed through a separate progress bar, and display effect is relatively simple. In addition, if an audio spectrum of the audio needs to be displayed, the audio spectrum needs to be displayed separately, resulting in occupying more space in the display interface of the audio playback App, affecting the audio playback experience of a user.

SUMMARY

Embodiments of the present disclosure provide an information displaying method and device, which, through displaying a playback progress of audio through an audio spectrum, possess rich display effects, and can also save a space occupied by the progress when displayed separately, and meanwhile, a user can perceive the playback progress when enjoying the audio spectrum, thereby improving a user experience.

In a first aspect, an embodiment of the present disclosure provides an information displaying method, including:
acquiring audio data to be played;
displaying an audio spectrum corresponding to the audio data, where the audio spectrum displays a playback progress of the audio data.

In a second aspect, an embodiment of the present disclosure provides an information display device, including:
an acquiring module, configured to acquire audio data to be played; and
a displaying module, configured to display an audio spectrum corresponding to the audio data, where the audio spectrum displays a playback progress of the audio data.

In a third aspect, according to one or more embodiments of the present disclosure, an electronic device is provided, including: a processor and a memory; where the memory stores computer executable instructions; the processor executes the computer executable instructions stored in the memory to cause the processor to execute the information displaying method according to the first aspect above and various possible designs of the first aspect.

In a fourth aspect, according to one or more embodiments of the present disclosure, a computer-readable storage medium is provided, where the computer readable storage medium stores computer executable instructions, and when a processor executes the computer executable instructions, the information displaying method according to the first aspect above and various possible designs of the first aspect is implemented.

In a fifth aspect, according to one or more embodiments of the present disclosure, a computer program product is provided, the computer program includes: a computer program, and when the computer program is executed by a processor, the information displaying method according to the first aspect above and various possible designs of the first aspect is implemented.

In a sixth aspect, according to one or more embodiments of the present disclosure, a computer program is provided, and when the computer program is executed by a processor, the information displaying method according to the first aspect above and various possible designs of the first aspect is implemented.

The embodiments provide the information displaying method and device. Through displaying a playback progress of audio through an audio spectrum, the method can blend the audio spectrum with a progress bar and have rich display effects, and can also save a space occupied by the progress bar when displayed separately, and meanwhile, a user can perceive the playback progress of the audio when enjoying the audio spectrum, thereby improving an audio playback experience of the user.

BRIEF DESCRIPTION OF DRAWINGS

In order to illustrate technical solutions in embodiments of the present disclosure or the prior art more clearly, accompanying drawings that need to be used in description of the embodiments or the prior art will be briefly introduced below. It is obvious that the accompanying drawings in the following description are some embodiments of the present disclosure, and for those of ordinary skill in the art, other accompanying drawings may also be acquired according to these accompanying drawings without paying any creative efforts.

DESCRIPTION OF EMBODIMENTS

In order to make objectives, technical solutions and advantages of embodiments of the present disclosure clearer, the technical solutions in the embodiments of the present disclosure will be described clearly and completely in conjunction with the accompanying drawings in the embodiments of the present disclosure. Obviously, the described embodiments are a part of the embodiments of the present disclosure, not all of the embodiments of the present disclosure. Based on the embodiments in the present disclosure, all other embodiments acquired by those of ordinary skill in the art without paying any creative efforts fall within the protection scope of the present disclosure.

Figure 1:
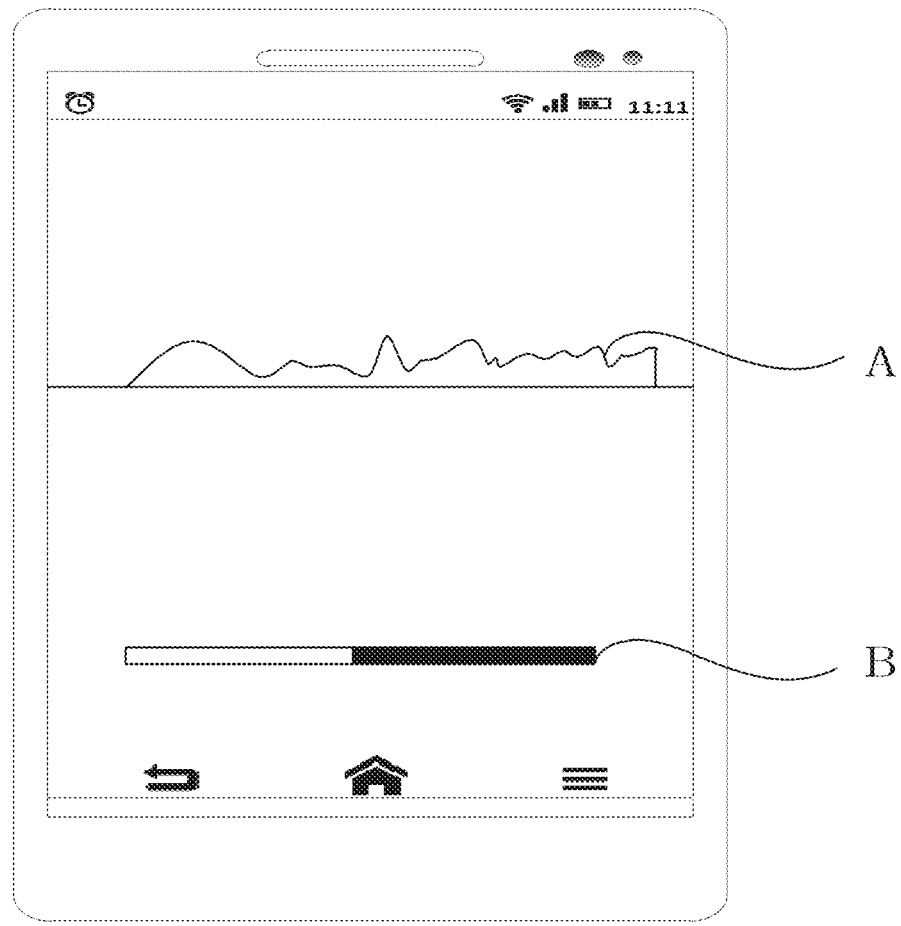
FIG. 1 is a schematic display diagram of an audio spectrum and a progress bar in the prior art.

Referring to FIG. 1, FIG. 1 is a schematic display diagram of an audio spectrum and a progress bar in the prior art. In an existing audio playback App, a separate progress bar (shown as B in the figure) is usually used in the prior art, and a playback progress of audio is displayed in a relatively simple manner. In addition, if an audio spectrum of the audio also needs to be displayed, the audio spectrum needs to be displayed separately (shown as A in the figure). Since the audio spectrum and the progress bar (are displayed separately, they occupy a relatively large space in a display interface of the App, which affects the placement of other controls. In addition, when a user enjoys the audio spectrum, he needs to watch separately to perceive the playback progress, which affects the audio playback experience of the user.

In order to solve the above technical problems existing in the prior art, embodiments of the present disclosure provides the following solutions: a playback progress of audio is shown through an audio spectrum, which can blend the audio spectrum with a progress bar and possess rich display effects, and can also save a space occupied by the progress bar when displayed separately, and at the same time, a user can perceive the playback progress of the audio when enjoying the audio spectrum, thereby improving the audio playback experience of the user.

A terminal involved in the present disclosure may be a wireless terminal or a wired terminal. The wireless terminal may be a device that provides voice and/or other service data connectivity to a user, a handheld device with wireless connection function, or other processing devices connected to a wireless modem. The wireless terminal may communicate with one or more core network devices through a radio access network (RAN). The wireless terminal may be a mobile terminal, such as a mobile phone (or called a "cellular" phone) and a computer with a mobile terminal, for example, it may be a portable, pocket, handheld, computer built-in or vehicle mounted mobile apparatus, and they exchange voice and/or data with wireless access networks. For another example, the wireless terminal may also be a personal communication service (PCS) telephone, a cordless telephone, a session initiation protocol (SIP) telephone, a wireless local loop (WLL) station, a personal digital assistant (PDA) and other devices. The wireless terminal may also be called as a system, a subscriber unit, a subscriber station, a mobile station, a mobile, a remote station, a remote terminal, an access terminal, a user terminal, a user agent, a user device (User Equipment), which is not limited here. In an implementation, the terminal device may also be a smart watch, a tablet computer and other devices. An interface is displayed by running an audio playback App installed on the terminal.

Figure 2:
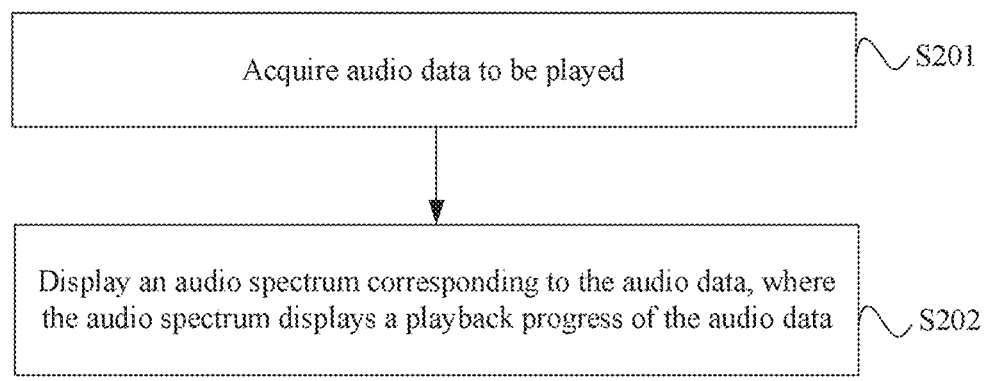
FIG. 2 is a first schematic flow diagram of an information displaying method according to an embodiment of the present disclosure.

Referring to FIG. 2, FIG. 2 is a first schematic flow diagram of an information displaying method according to an embodiment of the present disclosure. The displaying method of an audio spectrum in the embodiment of the present disclosure may be applied to a terminal with a display interface. The information displaying method includes:

S201: acquire audio data to be played.

In the embodiment of the present disclosure, the audio data to be played may be a complete piece of audio data or an audio data segment extracted from complete audio data.

Specifically, the audio data to be played may be acquired in real time by online loading through a network, or a locally stored audio to be played (such as audio data cached in an audio playback APP) may be acquired.

S202: display an audio spectrum corresponding to the audio data, where the audio spectrum displays a playback progress of the audio data.

In the embodiment of the present disclosure, the audio spectrum may be displayed in a form of a column bar or waveform graph.

Specifically, pulse code modulation data of the audio data may be extracted, a spectrum array of the audio data can be obtained according to the pulse code modulation data, the audio spectrum can be generated according to the spectrum array, and the audio spectrum can be displayed on the display interface.

The audio data further includes audio progress callback data, and the playback progress of the audio data may be obtained according to the audio progress callback data.

In an embodiment of the present disclosure, the audio spectrum may be displayed differently according to colors. Specifically, the audio spectrum may be divided into two colors, where an audio spectrum in one color represents a playback length of audio data that has been played, and an audio spectrum in the other color represents a playback length of audio data that has not been played.

Figure 3:
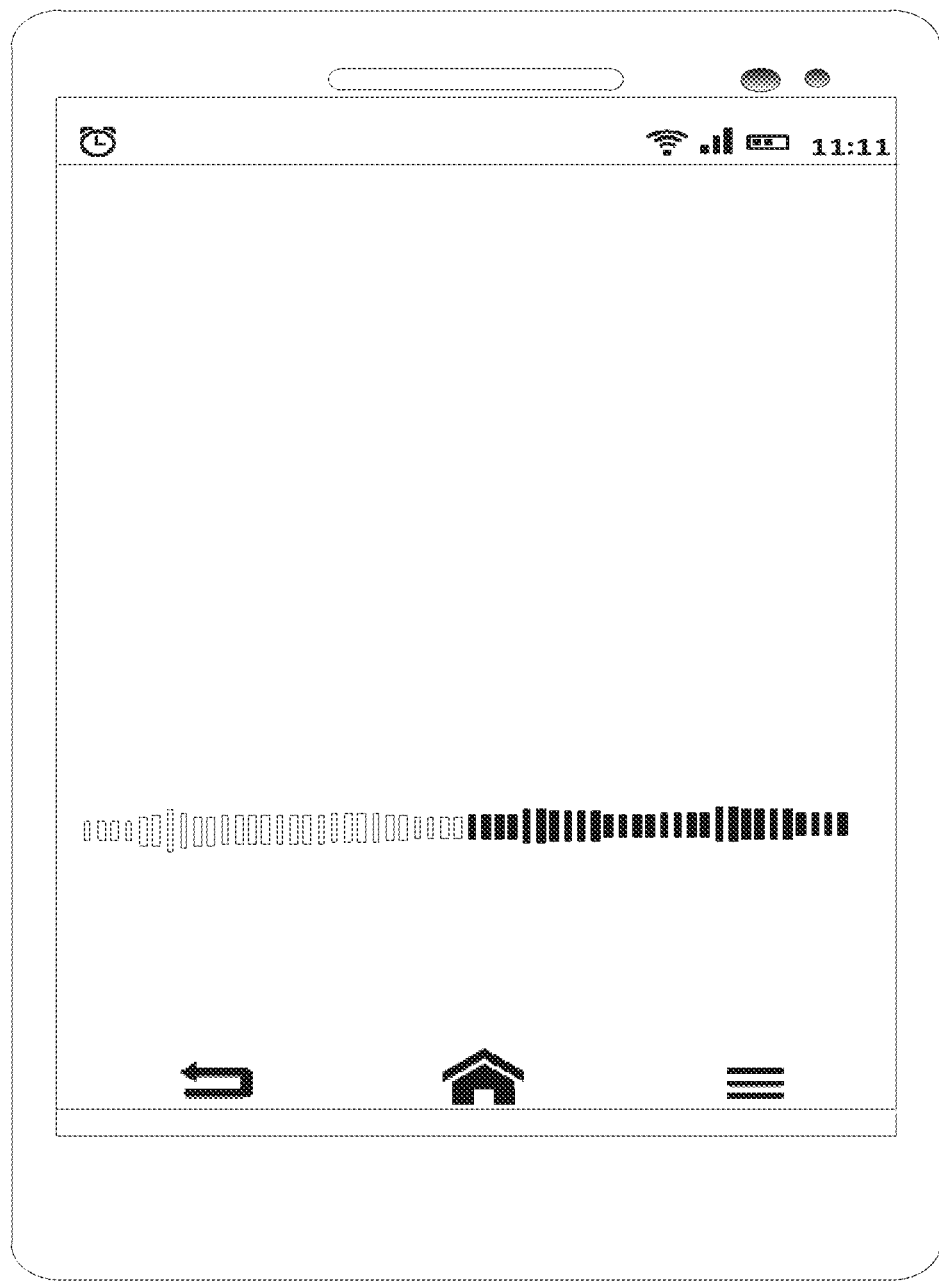
FIG. 3 is a first schematic display diagram of an audio spectrum according to an embodiment of the present disclosure.

Referring to FIG. 3, FIG. 3 is a first schematic display diagram of an audio spectrum according to an embodiment of the present disclosure. In FIG. 3, a white audio spectrum is used to represent the playback length of the audio data that has been played, and a black audio spectrum is used to represent the playback length of the audio data that has not been played.

In another embodiment of the present disclosure, the audio spectrum may also be displayed differently according to spectrum shapes. Specifically, the audio spectrum may be divided into two spectrum shapes, an audio spectrum in one shape represents a playback length of audio data that has been played, and an audio spectrum in the other shape represents a playback length of audio data that has not been played.

Figure 4:
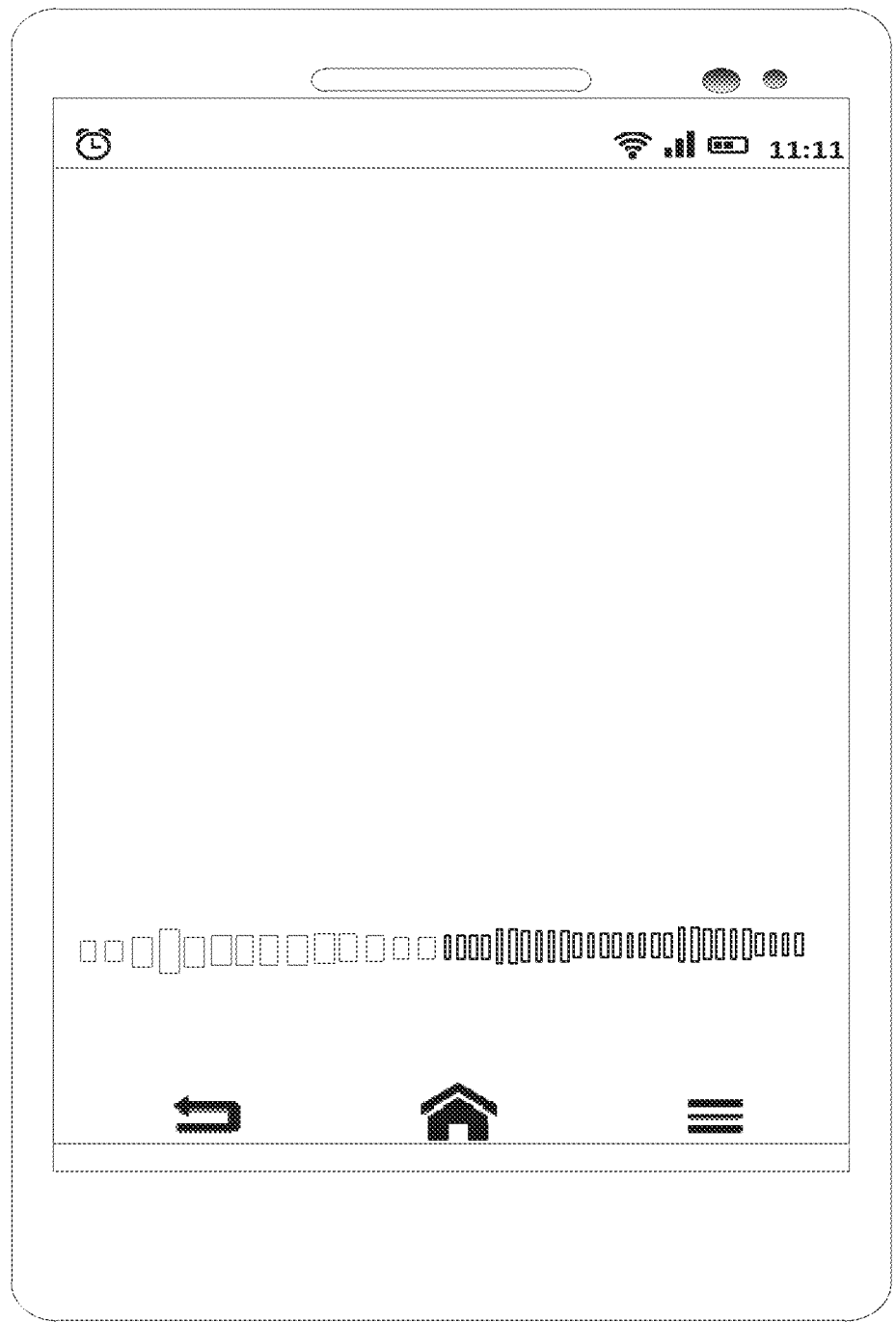
FIG. 4 is a second schematic display diagram of an audio spectrum according to an embodiment of the present disclosure.

Referring to FIG. 4, FIG. 4 is a second schematic display diagram of an audio spectrum according to an embodiment of the present disclosure. In FIG. 4, an audio spectrum in wider columns is used to represent the playback length of audio data that has been played, and an audio spectrum in narrower columns is used to represent the playback length of audio data that has not been played.

It can be seen from the above description that, displaying a playback progress of audio through an audio spectrum can blend the audio spectrum with the progress bar, possessing rich display effects, and can also save a space occupied by the progress bar when displayed separately; and meanwhile, a user can perceive the playback progress of the audio when enjoying the audio spectrum, thereby improving the audio playback experience of the user.

In an embodiment of the present disclosure, referring to FIG. 3, a specific implementation of the above step S202 is as follows:

displaying a first part of the audio spectrum in a first color and displaying a second part of the audio spectrum in a second color; where the first color is different from the second color, and a relative proportion of the first part of the audio spectrum to the second part of the audio spectrum changes with the playback progress of the audio data.

Figure 5:
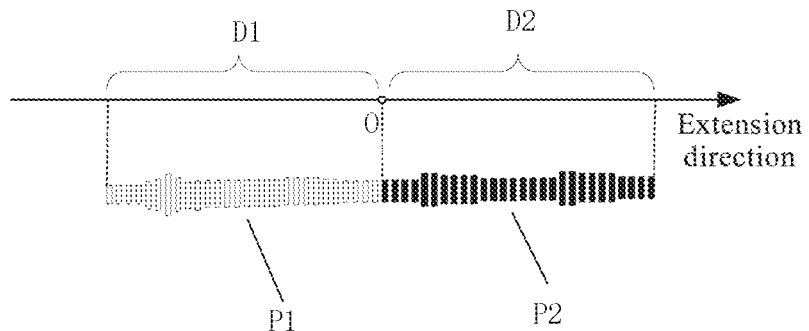
FIG. 5 is a schematic diagram of a principle for displaying an audio spectrum according to an embodiment of the present disclosure.

Referring to FIG. 5, in the embodiment of the present disclosure, the relative proportion of the first part to the second part of the audio spectrum refers to: the audio spectrum is divided into the first part P1 and the second part P2 in its extension direction, and taking a boundary O between the two parts as a reference point, the audio spectrum is divided into two segments in its extension direction, so that the audio spectrum corresponds to two line segments (D1 and D2) in its extension direction; and a ratio of a length of the first line segment (D1) corresponding to the first part of the audio spectrum to a length of the second line segment (D2) corresponding to the second part of the audio spectrum is the relative proportion of the first part to the second part of the audio spectrum.

The first color and the second color may be any other two different colors. For example, the first color may be white and the second color may be gray.

It can be seen from the above description that the audio spectrum is displayed separately in the first color and the second color. The relative proportion of the first color to the second color changes with the playback progress of the audio data. The playback progress of the audio data is displayed through different spectrum colors, so that the user can perceive the playback progress of the music through the color change of the spectrum while enjoying the audio spectrum, thereby improving the use experience of the user.

In the embodiment of the present disclosure, the first part and the second part of the audio spectrum may be displayed in different colors by masking, which is specifically as follows:

establishing a first masked layer of the first color and a second masked layer of the second color; taking the audio spectrum as a mask layer to process the first masked layer and the second masked layer, so that a first part of the audio spectrum corresponding to the first masked layer is displayed in the first color and a second part of the audio spectrum corresponding to the second masked layer is displayed in the second color, where a relative proportion of the first masked layer to the second masked layer changes with the playback progress of the audio data.

The first masked layer and the second masked layer are used as the masked layers, and the audio spectrum is the mask layer. For example, the first masked layer is a rectangular box in the first color, and the audio spectrum shape of the first color is displayed through the mask layer of the audio spectrum shape. Similarly, the second masked layer is a rectangular box in the second color, and the audio spectrum shape of the second color is displayed through the mask layer of the audio spectrum shape.

It should be noted that the relative proportion of the first masked layer to the second masked layer is consistent with the description of the relative proportion of the first part to the second part of the audio spectrum, which will not be repeated here.

It can be seen from the above description that the embodiment does not need to carry out a complex processing on an output audio spectrum, and an effect of distinguishing and displaying the audio spectrum in different colors can be realized by masking.

In an embodiment of the present disclosure, referring to FIG. 4, another specific implementation of the above step S202 is as follows:

displaying a first part of the audio spectrum in a first shape and displaying a second part of the audio spectrum in a second shape; where the first shape is different from the second shape, and a proportion of the first part of the audio spectrum to the second part of the audio spectrum changes with the playback progress of the audio data.

In this embodiment, the first shape and the second shape may be different shapes, or may be a same shape with different sizes. For example, the first shape is square and the second shape is rectangular. Alternatively, the first shape is a wider column, and the first shape is a narrower column.

It should be noted that the relative portion of the first shape to the second shape is consistent with the description of the relative portion of the first part to the second part of the audio spectrum, which will not be repeated here.

It can be seen from the above description that the playback progress of the audio data is displayed through different spectrum shapes, so that the user can perceive the playback progress of music through the shape changes of the spectrum while enjoying the audio spectrum, thereby improving the use experience of the user.

It should be noted that the embodiment of the present disclosure may also display the audio spectrum through a combination of color change and shape change, and the principle thereof is similar to the above embodiments and will not be repeated here. Displaying the playback progress through the combination of color change and shape change, has a more obvious visual effect and the user's perception is stronger.

Figure 6:
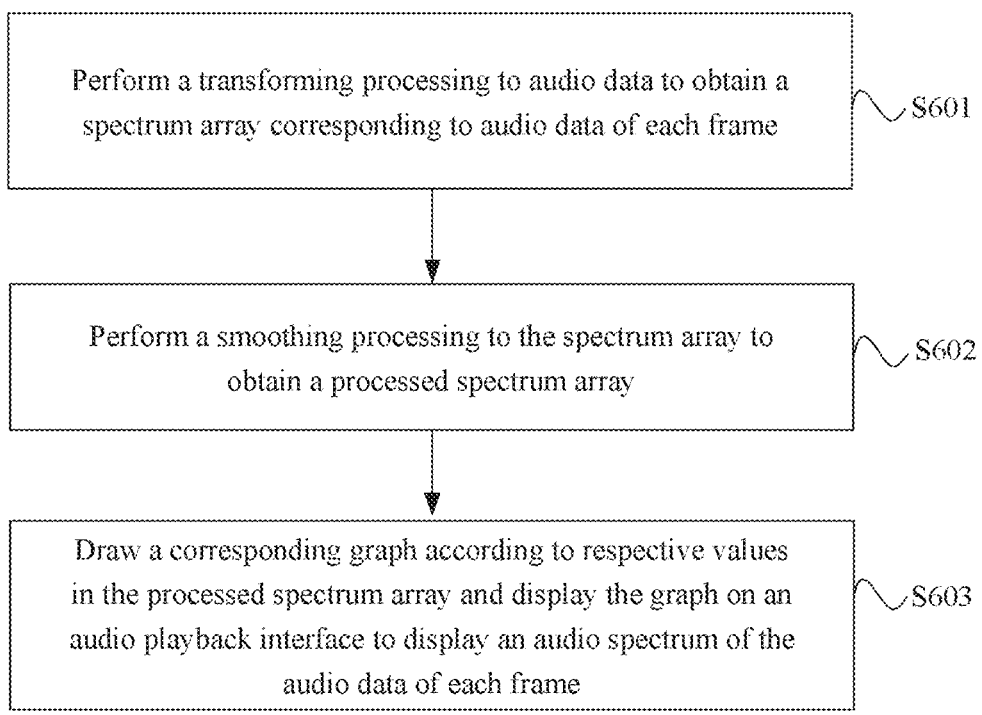
FIG. 6 is a second schematic flow diagram of an information displaying method according to an embodiment of the present disclosure.

Referring to FIG. 6, FIG. 6 is a second schematic flow diagram of an information displaying method according to an embodiment of the present disclosure. Based on the above embodiments, this embodiment mainly describes the process of how to generate and display the audio spectrum during audio data is played, which is detailed as follows:

S601: perform a transforming processing to the audio data to obtain a spectrum array corresponding to audio data of each frame.

In the embodiment of the present disclosure, the audio data of each frame refers to a data segment obtained by dividing the audio data frame by frame according to a playing order of the audio data.

Specifically, first, pulse code modulation data of the audio data is acquired; then the pulse code modulation data is converted from a time domain to a frequency domain to obtain the spectrum array corresponding to the audio data of each frame.

The pulse code modulation data (a non-periodic continuous signal in the time domain) may be converted from the time domain to the frequency domain through a fast Fourier transform to obtain the spectrum array (a non-periodic continuous signal in the frequency domain). In an iOS system, the fast Fourier transform can be implemented through a vDSP framework.

S602: perform a smoothing processing to the spectrum array to obtain a processed spectrum array.

S603: draw a corresponding graph according to respective values in the processed spectrum array and display the graph on an audio playback interface to display an audio spectrum of the audio data of each frame.

In the embodiment of the present disclosure, the smoothing processing may be a smoothing processing on respective values in the spectrum array corresponding to the audio data of each frame, or a smoothing processing on spectrum arrays of respective frames of audio data.

The graph is column bars or a waveform line.

If the graph is column bars, then a corresponding audio spectrum is a column graph composed of a series of column bars. For the audio spectrum in a column graph, the interface display is more concise and the user experience is more friendly.

If the graph is the waveform line, then a corresponding audio spectrum is a wavy graph composed of a waveform line. For the audio frequency spectrum in a wavy graph, the interface display is more concise and closer to real audio frequency, and the user has a more vivid perception.

It can be seen from the description of the above embodiments that by performing the smoothing processing to the spectrum array, the audio spectrum display is smoother and continuous, and the user's visual effect is better.

In an implementation, the following operation is performed for respective values in the spectrum array of the audio data of each frame: adding a target value, a preset number of values before the target value and the preset number of values after the target value according to a first preset weight to obtain a final value of the target value.

A target value refers to any value in the spectrum array. The preset number can be arbitrary. For example, the preset number is 2, that is, a target value and two values before the target value and two values after the target value (a total of 5 values) are added according to the first preset weight.

In an implementation, the first preset weights are 10%, 20%, 50%, 20% and 10% respectively according to the order of respective values in the spectrum array.

It can be seen from the above description that by weighting the values in the spectrum array, the difference between a left value and a right value in the spectrum array is smaller, thereby making the left value and the right value of the audio spectrum of each frame more continuous and making the audio spectrum of each frame smoother.

In another implementation, the following operation is performed for spectrum arrays of respective frames of the audio data: adding values at a same position in a spectrum array of any target frame and a spectrum array of a previous frame of the target frame according to a second preset weight to obtain a final value of each value of the spectrum array of the target frame.

Any target frame refers to any frame in the respective frames of the audio data. The values at the same position refers to the values corresponding to the same sequential position in the two spectrum arrays.

In an implementation, the second preset weights are 50% and 50%, respectively.

It can be seen from the above description that by weighting the spectrum arrays of respective frames, the changes of the audio spectrums at the same position between respective frames are gentler, and a drastic change of the audio spectrums at the same position of two frames, which affects the visual effect, is avoided.

Figure 7:
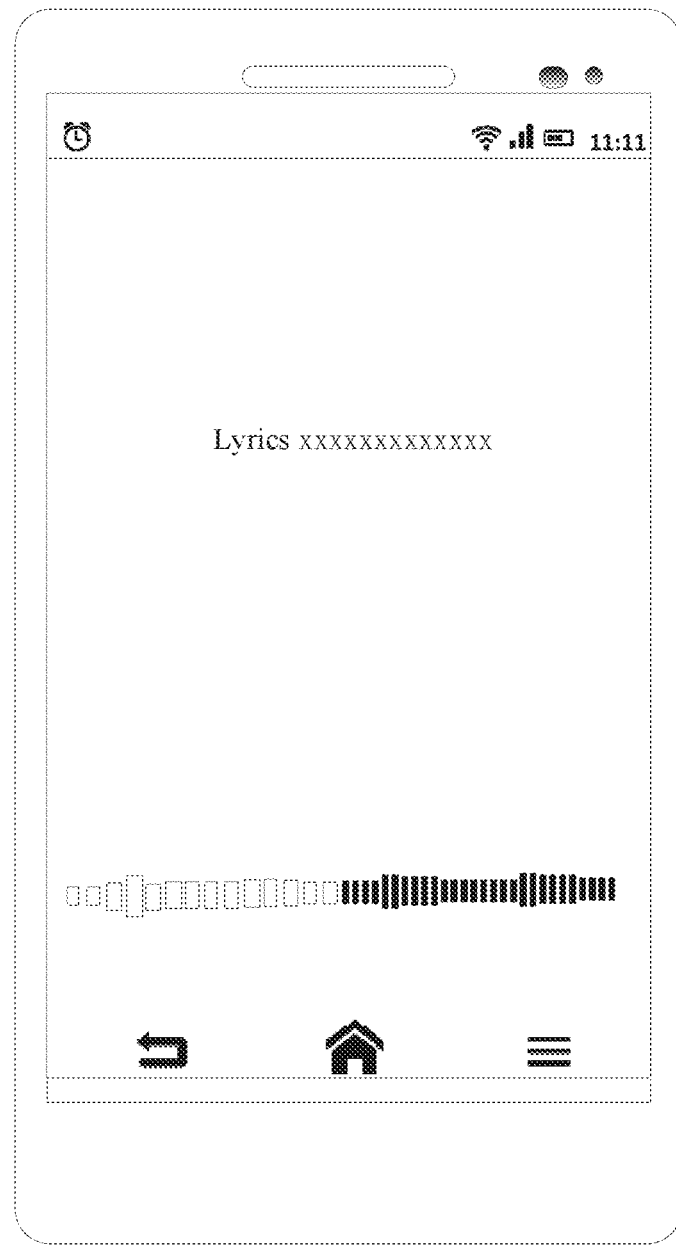
FIG. 7 is a third schematic display diagram of an audio spectrum according to an embodiment of the present disclosure.

Referring to FIG. 7, FIG. 7 is a third schematic display diagram of an audio spectrum method according to an embodiment of the present disclosure. In an embodiment of the present disclosure, the information displaying method further includes: acquiring lyrics data of the audio data, and displaying the playback progress of the audio data and lyrics corresponding to the audio spectrum on the audio playback interface.

In the embodiment of the present disclosure, the audio data can be parsed to extract a lrc (lyric) file in the audio data, and the lyrics data of the audio data can be obtained.

By displaying the playback progress of the audio data and the lyrics corresponding to the audio spectrum on the audio playback interface, a synchronous linkage of lyrics, spectrum and progress is realized.

In an embodiment of the present disclosure, the information displaying method further includes:
changing the playback progress of the audio data in response to a first triggering operation by a user on the audio spectrum.

In the embodiment of the present disclosure, the user's first triggering operation on the audio spectrum may be the user dragging a preset position of the audio spectrum. The preset position may be a boundary between different colors or different shapes of the audio spectrum.

Through the operation on audio spectrum, the progress of music data can be adjusted. There is no need to provide a progress bar on the music playback interface, thereby saving a space of the music playback interface and improving the user experience.

In an embodiment of the present disclosure, the information displaying method further includes displaying the playback progress of the audio data in response to a second trigger operation by a user on the audio spectrum.

The user's second trigger operation on the audio spectrum can be clicking any position of the audio data. The manner of displaying the playback progress of the audio data includes: a corresponding relationship between a played time length and a total time length, a corresponding relationship between the played time length and an unplayed time length, or a corresponding relationship between the unplayed time length and a remaining time length.

The playback progress of audio data is displayed under the triggering on the audio spectrum by the user, which improves the user's experience of viewing the playback progress.

Figure 8:
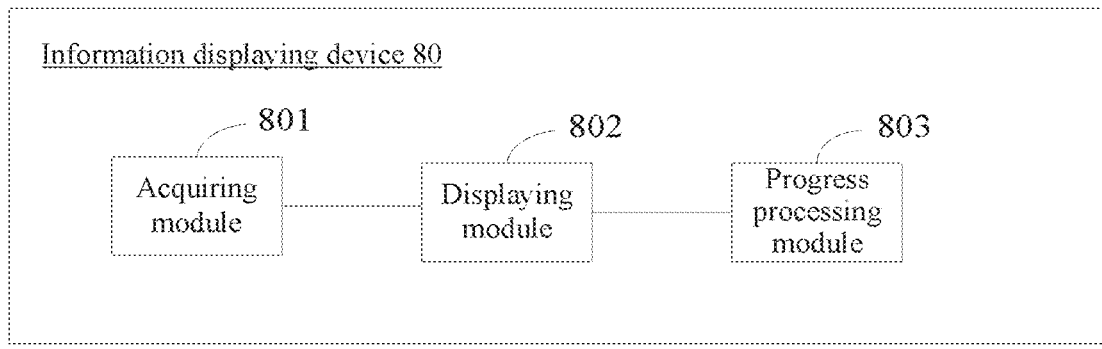
FIG. 8 is a structural block diagram of an information display device according to an embodiment of the present disclosure.

Referring to FIG. 8, FIG. 8 is a structural block diagram of an information display device according to an embodiment of the present disclosure. For ease of illustration, only parts related to embodiments of the present disclosure are shown. Referring to FIG. 8, an information displaying device 80 includes an acquiring module 801 and a displaying module 802.

The acquiring module 801 is configured to acquire audio data to be played.

The displaying module 802 is configured to display an audio spectrum corresponding to the audio data, where the audio spectrum displays a playback progress of the audio data.

In an embodiment of the present disclosure, the displaying module 802 is specifically configured to display a first part of the audio spectrum in a first color and display a second part of the audio spectrum in a second color; where the first color is different from the second color, and a relative proportion of the first part of the audio spectrum to the second part of the audio spectrum changes with the playback progress of the audio data.

In an embodiment of the present disclosure, the displaying module 802 is specifically configured to establish a first masked layer of the first color and a second masked layer of the second color; and take the audio spectrum as a mask layer to process the first masked layer and the second masked layer, so that a first part of the audio spectrum corresponding to the first masked layer is displayed in the first color and a second part of the audio spectrum corresponding to the second masked layer is displayed in the second color, where a relative proportion of the first masked layer to the second masked layer changes with the playback progress of the audio data.

In an embodiment of the present disclosure, the displaying module 802 is further specifically configured to display a first part of the audio spectrum in a first shape and display a second part of the audio spectrum in a second shape; where the first shape is different from the second shape, and a proportion of the first part of the audio spectrum to the second part of the audio spectrum changes with the playback progress of the audio data.

In an embodiment of the present disclosure, the displaying module 802 is further specifically configured to perform a transforming processing to the audio data to obtain a spectrum array corresponding to audio data of each frame; perform a smoothing processing to the spectrum array to obtain a processed spectrum array; and draw a corresponding graph according to respective values in the processed spectrum array and display the graph on an audio playback interface to display an audio spectrum of the audio data of each frame.

In an embodiment of the present disclosure, the displaying module 802 is further specifically configured to perform a following operation for respective values in the spectrum array of the audio data of each frame: adding any target value, a preset number of values before the target value and the preset number of values after the target value according to a first preset weight to obtain a final value of the target value.

In an embodiment of the present disclosure, the displaying module 802 is further specifically configured to perform a following operation for spectrum arrays of respective frames of the audio data: add values at a same position in a spectrum array of any target frame and a spectrum array of a previous frame of the target frame according to a second preset weight to obtain a final value of each value of the spectrum array of the target frame.

In an embodiment of the present disclosure, the displaying module 802 is further specifically configured to acquire pulse code modulation data of the audio data; and convert the pulse code modulation data from a time domain to a frequency domain to obtain a spectrum array corresponding to the audio data of each frame.

In an embodiment of the present disclosure, the device further includes a progress processing module 803, configured to change the playback progress of the audio data in response to a first triggering operation by a user on the audio spectrum.

In an embodiment of the present disclosure, the progress processing module 803 is further configured to display the playback progress of the audio data in response to a second trigger operation by a user on the audio spectrum.

The device provided by the present embodiment can be used to perform the technical solutions of the above method embodiments, implementation principles and technical effects thereof are similar, and will not be repeated in the present embodiment herein.

In order to implement the above embodiments, an embodiment of the present disclosure further provide an electronic device.

Figure 9:
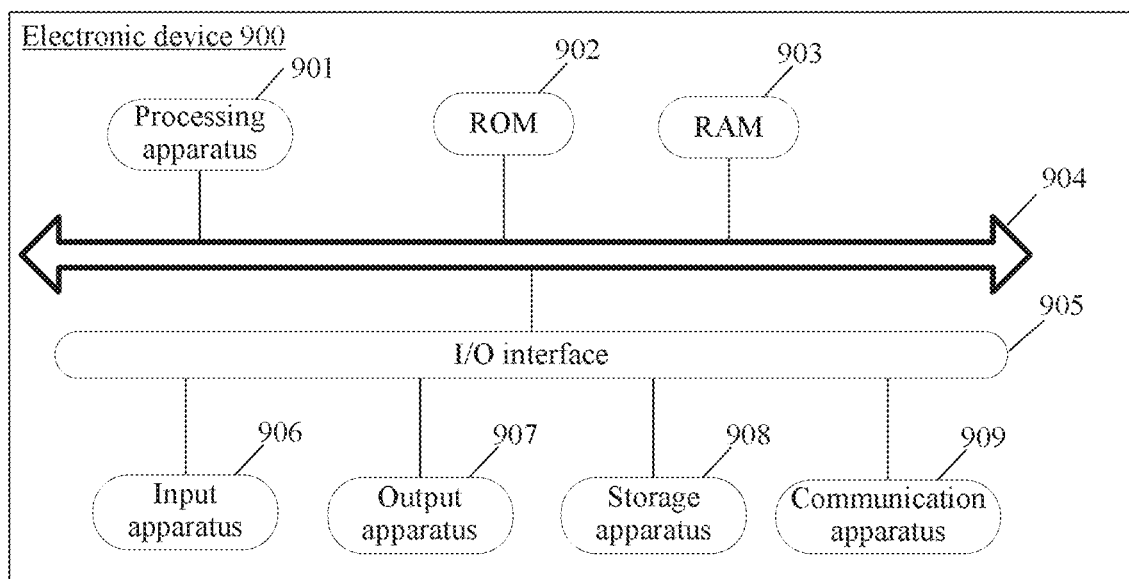
FIG. 9 is a structural diagram of an electronic device according to an embodiment of the present disclosure.

Referring to FIG. 9, it shows a structural schematic diagram of an electronic device 900 suitable for implementing the embodiments of the present disclosure, and the electronic device 900 may be a terminal device or a server. The terminal device may include, but is not limited to, a mobile terminal, such as a mobile phone, a notebook computer, a digital broadcast receiver, a personal digital assistant (PDA), a portable android device (PAD), a portable media player (PMP), an in-vehicle terminal (for example, an in-vehicle navigation terminal), and a fixed terminal, such as a digital television (TV), a desktop computer. The electronic device shown in FIG. 9 is merely an example, and should not bring about any limitation to functions and usage scopes of the embodiments of the present disclosure.

As shown in FIG. 9, the electronic device 900 may include a processing apparatus (for example, a central processor, a graphic processor, etc.) 901, which may perform various appropriate actions and processing according to a program stored in a read only memory (ROM) 902 or a program loaded from a storage apparatus 908 to a random access memory (RAM) 903. In the RAM 903, various programs and data required for operations of the electronic device 900 may also be stored. The processing apparatus 901, the ROM 902, and the RAM 903 are connected to each other by a bus 904. An input/output (I/O) interface 905 is also connected to the bus 904.

Generally, the following apparatuses may connect to the I/O interface 905: an input apparatus 906, which includes, for example, a touch screen, a touch pad, a keyboard, a mouse, a camera, a microphone, an accelerometer, a gyroscope, etc.; an output apparatus 907, which includes, for example, a liquid crystal display (LCD), a speaker, a vibrator, etc.; a storage apparatus 908, which includes, for example, a magnetic tape, a hard disk, etc.; and a communication apparatus 909. The communication apparatus 909 may allow the electronic device 900 to communicate with other devices in a wireless or wired way, to exchange data. Although FIG. 9 shows an electronic device 900 having various apparatuses, it should be understood that it is not required to implement or have all of the shown apparatuses. It is alternatively possible to implement or have more or fewer apparatuses.

In particular, according to an embodiment of the present disclosure, processes described above with reference to flowchart may be implemented as a computer software program. For example, an embodiment of the present disclosure includes a computer program product, which includes a computer program carried on a computer readable medium, and the computer program contains program codes used for executing the method shown in the flowchart. In such embodiment, the computer program may be downloaded and installed from a network via the communication apparatus 909, or installed from the storage apparatus 908, or installed from the ROM 902. When the computer program is executed by the processing apparatus 901, the above functions defined in the method of the embodiments of the present disclosure are performed. An embodiment of the present disclosure further includes a computer program that, when executed by a processor, implements the above functions defined in the method of the embodiments of the present disclosure.

It should be noted that the above computer readable medium in the present disclosure may be a computer readable signal medium, or a computer readable storage medium, or any combination of both. The computer readable storage medium may be, for example, but is not limited to, an electrical, magnetic, optical, electromagnetic, infrared, or semiconductor system, apparatus, or components, or any combination thereof. More specific examples of the computer readable storage medium may include, but is not limited to: an electrical connection with one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage component, a magnetic storage component, or any suitable combination thereof. In the present disclosure, a computer readable storage medium may be any tangible medium that contains or stores a program, and the program may be used by or in combination with an instruction execution system, apparatus, or component. In the present disclosure, a computer readable signal medium may include a data signal propagated in a baseband or as a part of a carrier, and the data signal carries computer readable program codes. Such propagated data signal may take various forms, including but not limited to an electromagnetic signal, an optical signal, or any suitable combination thereof. The computer readable signal medium may also be any computer readable medium other than the computer readable storage medium, and the computer readable signal medium may send, propagate, or transmit a program which is used by or in combination with the instruction execution system, apparatus, or component. The program codes contained in the computer readable medium may be transmitted by any suitable medium, including but is not limited to: a wire, an optical cable, a radio frequency (RF), etc., or any suitable combination thereof.

The above computer readable medium may be included in the above electronic device; or may exist alone without being assembled into the electronic device.

The above computer readable medium carries one or more programs that, when executed by the electronic device, cause the electronic device to perform the method shown in the above embodiments.

The computer program codes used to perform operations of the present disclosure may be written in one or more programming languages or a combination thereof, the above programming languages include object-oriented programming languages, such as Java, Smalltalk, C++, and also include conventional procedural programming languages, such as "C" language or similar programming language. The program codes may be executed entirely on a user's computer, executed partly on a user's computer, executed as an independent software package, executed partly on a user's computer and partly on a remote computer, or executed entirely on a remote computer or a server. In the case of a remote computer involved, the remote computer may connect to the user's computer through any kind of networks, which includes a local area network (LAN) or a wide area network (WAN), or, the remote computer may connect to an external computer (for example, connect to the external computer via the Internet by utilizing an internet service provider).

Flowcharts and block diagrams in the accompanying drawings illustrate architectures, functions, and operations of possible implementations of systems, methods and computer program products according to various embodiments of the present disclosure. In this regard, each block in the flowcharts or block diagrams may represent a module, a program segment, or a part of codes, and the module, the program segment, or the part of codes contains one or more executable instructions used for realizing specified logic functions. It should also be noted that in some alternative implementations, functions marked in the block may also occur in an order different from the order marked in the accompanying drawings. For example, two blocks shown in succession may actually be performed substantially in parallel, and they may sometimes be performed in a reverse order, depending on the functions involved. It should also be noted that each block in the block diagrams and/or the flowcharts as well as combinations of blocks in the block diagrams and/or the flowcharts may be implemented by a dedicated hardware-based system that performs specified functions or operations, or may be implemented by a combination of dedicated hardware and computer instructions.

Units involved in the embodiments described in the present disclosure may be implemented in a software or hardware manner. A name of a unit does not constitute a limitation on the unit itself under certain circumstances, for example, a first acquiring unit may also be described as "a unit for acquiring at least two internet protocol addresses".

The functions herein described above may be performed at least in part by one or more hardware logic assemblies. For example, without limitation, exemplary types of hardware logic assemblies that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store a program to be used by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination thereof.

In a first aspect, according to one or more embodiments of the present disclosure, an information displaying method is provided, including: acquiring audio data to be played; displaying an audio spectrum corresponding to the audio data, where the audio spectrum displays a playback progress of the audio data.

According to one or more embodiments of the present disclosure, displaying the audio spectrum corresponding to the audio data, where the audio spectrum displays the playback progress of the audio data, includes:
  displaying a first part of the audio spectrum in a first color and displaying a second part of the audio spectrum in a second color; where the first color is different from the second color, and a relative proportion in the first part of the audio spectrum to the second part of the audio spectrum changes with the playback progress of the audio data.

According to one or more embodiments of the present disclosure, displaying the first part of the audio spectrum in the first color and displaying the second part of the audio spectrum in the second color includes:
  establishing a first masked layer of the first color and a second masked layer of the second color;

taking the audio spectrum as a mask layer to process the first masked layer and the second masked layer, so that a first part of the audio spectrum corresponding to the first masked layer is displayed in the first color and a second part of the audio spectrum corresponding to the second masked layer is displayed in the second color, where a relative proportion of the first masked layer to the second masked layer changes with the playback progress of the audio data.

According to one or more embodiments of the present disclosure, displaying the audio spectrum corresponding to the audio data, where the audio spectrum displays the playback progress of the audio data, includes:

displaying a first part of the audio spectrum in a first shape and displaying a second part of the audio spectrum in a second shape; where the first shape is different from the second shape, and a proportion of the first part of the audio spectrum to the second part of the audio spectrum changes with the playback progress of the audio data.

According to one or more embodiments of the present disclosure, displaying the audio spectrum corresponding to the audio data includes:

performing a transforming processing to the audio data to obtain a spectrum array corresponding to audio data of each frame;
performing a smoothing processing to the spectrum array to obtain a processed spectrum array;
drawing a corresponding graph according to respective values in the processed spectrum array and displaying the graph on an audio playback interface to display an audio spectrum of audio data of each frame.

According to one or more embodiments of the present disclosure, the graph is column bars or a waveform line.

According to one or more embodiments of the present disclosure, performing the smoothing processing to the spectrum array to obtain the processed spectrum array includes:

performing a following operation for respective values in the spectrum array of the audio data of each frame:
adding any target value, a preset number of values before the target value and the preset number of values after the target value according to a first preset weight to obtain a final value of the target value.

According to one or more embodiments of the present disclosure, performing the smoothing processing to the spectrum array to obtain the processed spectrum array includes:

performing a following operation for spectrum arrays of respective frames of the audio data:
adding values at a same position in a spectrum array of any target frame and a spectrum array of a previous frame of the target frame according to a second preset weight to obtain a final value of each value of the spectrum array of the target frame.

According to one or more embodiments of the present disclosure, performing the transforming processing to the audio data to obtain the spectrum array corresponding to the audio data of each frame includes:

acquiring pulse code modulation data of the audio data;
converting the pulse code modulation data from a time domain to a frequency domain to obtain a spectrum array corresponding to the audio data of each frame.

According to one or more embodiments of the present disclosure, the method further includes:

changing the playback progress of the audio data in response to a first triggering operation by a user on the audio spectrum.

According to one or more embodiments of the present disclosure, the method further includes:

displaying the playback progress of the audio data in response to a second triggering operation by a user on the audio spectrum.

In a second aspect, according to one or more embodiments of the present disclosure, an information display device is provided, including:

an acquiring module, configured to acquire audio data to be played;
a displaying module, configured to display an audio spectrum corresponding to the audio data, where the audio spectrum displays a playback progress of the audio data.

According to one or more embodiments of the present disclosure, the displaying module is specifically configured to display a first part of the audio spectrum in a first color and display a second part of the audio spectrum in a second color; where the first color is different from the second color, and a relative proportion of the first part of the audio spectrum to the second part of the audio spectrum changes with the playback progress of the audio data.

According to one or more embodiments of the present disclosure, the displaying module is specifically configured to establish a first masked layer of the first color and a second masked layer of the second color; and take the audio spectrum as a mask layer to process the first masked layer and the second masked layer, so that a first part of the audio spectrum corresponding to the first masked layer is displayed in the first color and a second part of the audio spectrum corresponding to the second masked layer is displayed in the second color, where a relative proportion of the first masked layer to the second masked layer changes with the playback progress of the audio data.

According to one or more embodiments of the present disclosure, the displaying module is further specifically configured to display a first part of the audio spectrum in a first shape and display a second part of the audio spectrum in a second shape; where the first shape is different from the second shape, and a proportion of the first part of the audio spectrum to the second part of the audio spectrum changes with the playback progress of the audio data.

According to one or more embodiments of the present disclosure, the displaying module is further specifically configured to perform a transforming processing to the audio data to obtain a spectrum array corresponding to audio data of each frame; perform a smoothing processing to the spectrum array to obtain a processed spectrum array; and draw a corresponding graph according to respective values in the processed spectrum array and display the graph on an audio playback interface to display an audio spectrum of the audio data of each frame.

According to one or more embodiments of the present disclosure, the displaying module is further specifically configured to perform a following operation for respective values in the spectrum array of the audio data of each frame: adding any target value, a preset number of values before the target value and the preset number of values after the target value according to a first preset weight to obtain a final value of the target value.

According to one or more embodiments of the present disclosure, the displaying module is further specifically configured to perform a following operation for spectrum arrays of respective frames of the audio data: add values at a same position in a spectrum array of any target frame and a spectrum array of a previous frame of the target frame according to a second preset weight to obtain a final value of each value of the spectrum array of the target frame.

According to one or more embodiments of the present disclosure, the displaying module is further specifically configured to acquire pulse code modulation data of the audio data; and convert the pulse code modulation data from a time domain to a frequency domain to obtain the spectrum array corresponding to the audio data of each frame.

According to one or more embodiments of the present disclosure, the device further includes a progress processing module, configured to change the playback progress of the audio data in response to a first triggering operation by a user on the audio spectrum.

According to one or more embodiments of the present disclosure, the progress processing module is further configured to display the playback progress of the audio data in response to a second triggering operation by the user on the audio spectrum.

In a third aspect, according to one or more embodiments of the present disclosure, an electronic device is provided, including: at least one processor and a memory;
where the memory stores computer executable instructions;
the at least one processor executes the computer executable instructions stored in the memory, causing the at least one processor to execute the information displaying method described above in the first aspect and various possible designs of the first aspect.

In a fourth aspect, according to one or more embodiments of the present disclosure, a computer-readable storage medium is provided, where the computer readable storage medium stores computer executable instructions, and when a processor executes the computer executable instructions, the information displaying method described in the first aspect and various possible designs of the first aspect is implemented.

In a fifth aspect, according to one or more embodiments of the present disclosure, a computer program product is provided, the computer program product includes: a computer program, and when the computer program is executed by a processor, the information displaying method described in the first aspect and various possible designs of the first aspect is implemented.

In a sixth aspect, according to one or more embodiments of the present disclosure, a computer program is provided, and when the computer program is executed by a processor, the information displaying method described in the first aspect and various possible designs of the first aspect is implemented.

The above description is merely illustration of preferred embodiments of the present disclosure and applied technical principles. Those skilled in the art should understand that the disclosed scope involved in the present disclosure is not limited to technical solutions formed by a specific combination of the above technical features, and should also cover other technical solutions formed by any combination of the above technical features or equivalent features thereof without departing from the above disclosed concept, for example, a technical solution formed by replacing the above features with technical features having similar functions as the above features and being disclosed in the present disclosure (without limitation).

In addition, although operations are depicted in a specific order, this should not be understood as requiring these operations to be performed in the specific order as shown or in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features described in the context of a single embodiment may also be implemented in multiple embodiments individually or in any suitable subcombination.

Although the present subject matter has been described in language specific to structural features and/or method logical actions, it should be understood that the subject matter defined in the appended claims is not necessarily limited to the specific features or actions described above. Conversely, the specific features and actions described above are merely example forms for implementing the claims.

What is claimed is:

1. An information displaying method implemented by a processor, comprising:
   acquiring audio data to be played;
   displaying an audio spectrum in a frequency domain corresponding to the audio data on a display interface of a terminal, wherein the audio spectrum displays a playback progress of the audio data;
   wherein the displaying the audio spectrum in the frequency domain corresponding to the audio data comprises:
   performing a transforming processing from a time domain to the frequency domain to the audio data to obtain a spectrum array in the frequency domain corresponding to audio data of each frame;
   performing a smoothing processing to the spectrum array to obtain a processed spectrum array; and
   drawing a corresponding graph according to respective values in the processed spectrum array and displaying the graph on an audio playback interface to display the audio spectrum of the audio data of each frame, wherein the audio spectrum in the frequency domain displayed by the graph displays the playback progress of the audio data.

2. The method according to claim 1, wherein the displaying the audio spectrum corresponding to the audio data, wherein the audio spectrum displays the playback progress of the audio data, comprises:
   displaying a first part of the audio spectrum in a first color and displaying a second part of the audio spectrum in a second color; wherein the first color is different from the second color, and a relative proportion of the first part of the audio spectrum to the second part of the audio spectrum changes with the playback progress of the audio data.

3. The method according to claim 2, wherein the displaying the first part of the audio spectrum in the first color and displaying the second part of the audio spectrum in the second color comprises:
   establishing a first masked layer of the first color and a second masked layer of the second color;
   taking the audio spectrum as a mask layer to process the first masked layer and the second masked layer, so that a first part of the audio spectrum corresponding to the first masked layer is displayed in the first color and a second part of the audio spectrum corresponding to the second masked layer is displayed in the second color, wherein a relative proportion of the first masked layer to the second masked layer changes with the playback progress of the audio data.

4. The method according to claim 1, wherein the displaying the audio spectrum corresponding to the audio data, wherein the audio spectrum displays the playback progress of the audio data, comprises:
displaying a first part of the audio spectrum in a first shape and displaying a second part of the audio spectrum in a second shape; wherein the first shape is different from the second shape, and a proportion of the first part of the audio spectrum to the second part of the audio spectrum changes with the playback progress of the audio data.

5. The method according to claim 1, wherein the graph is column bars or a waveform line.

6. The method according to claim 1, wherein the performing the smoothing processing to the spectrum array to obtain the processed spectrum array comprises:
performing a following operation for respective values in the spectrum array of the audio data of each frame:
adding any target value, a preset number of values before the target value and the preset number of values after the target value according to a first preset weight to obtain a final value of the target value.

7. The method according to claim 1, wherein the performing the smoothing processing to the spectrum array to obtain the processed spectrum array comprises:
performing a following operation for spectrum arrays of respective frames of the audio data:
adding values at a same position in a spectrum array of any target frame and a spectrum array of a previous frame of the target frame to obtain a final value of each value of the spectrum array of the target frame, wherein the adding is performed based on a second preset weight.

8. The method according to claim 1, wherein the performing the transforming processing from the time domain to the frequency domain to the audio data to obtain the spectrum array in the frequency domain corresponding to the audio data of each frame comprises:
acquiring pulse code modulation data of the audio data;
converting the pulse code modulation data from the time domain to the frequency domain to obtain the spectrum array corresponding to the audio data of each frame.

9. The method according to claim 1, further comprising:
changing the playback progress of the audio data in response to a first triggering operation by a user on the audio spectrum.

10. The method according to claim 1, further comprising:
displaying the playback progress of the audio data in response to a second triggering operation by a user on the audio spectrum.

11. An information displaying device, comprising: a processor and a memory;
wherein the memory stores computer executable instructions; and
when the processor, when executing the computer executable instructions stored in the memory, is configured to:
acquire audio data to be played; and
display an audio spectrum in a frequency domain corresponding to the audio data, wherein the audio spectrum displays a playback progress of the audio data;
perform a transforming processing from a time domain to the frequency domain to the audio data to obtain a spectrum array in the frequency domain corresponding to audio data of each frame;
perform a smoothing processing to the spectrum array to obtain a processed spectrum array; and
draw a corresponding graph according to respective values in the processed spectrum array and display the graph on an audio playback interface to display the audio spectrum of the audio data of each frame, wherein the audio spectrum in a frequency domain displayed by the graph displays the playback progress of the audio data.

12. The information displaying device according to claim 11, wherein the processor is further configured to:
display a first part of the audio spectrum in a first color and display a second part of the audio spectrum in a second color; wherein the first color is different from the second color, and a relative proportion of the first part of the audio spectrum to the second part of the audio spectrum changes with the playback progress of the audio data.

13. The information displaying device according to claim 12, wherein the processor is further configured to:
establish a first masked layer of the first color and a second masked layer of the second color; and
take the audio spectrum as a mask layer to process the first masked layer and the second masked layer, so that a first part of the audio spectrum corresponding to the first masked layer is displayed in the first color and a second part of the audio spectrum corresponding to the second masked layer is displayed in the second color, wherein a relative proportion of the first masked layer to the second masked layer changes with the playback progress of the audio data.

14. The information displaying device according to claim 11, wherein the processor is further configured to:
display a first part of the audio spectrum in a first shape and display a second part of the audio spectrum in a second shape; wherein the first shape is different from the second shape, and a proportion of the first part of the audio spectrum to the second part of the audio spectrum changes with the playback progress of the audio data.

15. The information displaying device according to claim 11, wherein the processor is further configured to:
perform a following operation for respective values in the spectrum array of the audio data of each frame:
adding any target value, a preset number of values before the target value and the preset number of values after the target value according to a first preset weight to obtain a final value of the target value.

16. The information displaying device according to claim 11, wherein the processor is further configured to:
perform a following operation for spectrum arrays of respective frames of the audio data:
adding values at a same position in a spectrum array of any target frame and a spectrum array of a previous frame of the target frame to obtain a final value of each value of the spectrum array of the target frame, wherein the adding is performed based on a second preset weight.

17. The information displaying device according to claim 11, wherein the processor is further configured to:
acquire pulse code modulation data of the audio data; and
convert the pulse code modulation data from the time domain to the frequency domain to obtain the spectrum array corresponding to the audio data of each frame.

18. A non-transitory computer-readable storage medium, wherein the non-transitory computer readable storage medium stores computer executable instructions, and when a processor executes the computer executable instructions, following steps are implemented:

acquiring audio data to be played; and displaying an audio spectrum in a frequency domain corresponding to the audio data, wherein the audio spectrum displays a playback progress of the audio data;

wherein the displaying the audio spectrum in the frequency domain corresponding to the audio data comprises:

performing a transforming processing from a time domain to the frequency domain to the audio data to obtain a spectrum array in the frequency domain corresponding to audio data of each frame;

performing a smoothing processing to the spectrum array to obtain a processed spectrum array; and drawing a corresponding graph according to respective values in the processed spectrum array and displaying the graph on an audio playback interface to display the audio spectrum of the audio data of each frame, wherein the audio spectrum in the frequency domain displayed by the graph displays the playback progress of the audio data.

\* \* \* \* \*